UNITED STATES PATENT OFFICE.

JOHN F. GREENE, OF BROOKLYN, NEW YORK.

IMPROVEMENT IN THE PROCESSES OF OBTAINING FELTING MATERIAL FROM WASTE FELTED FABRICS.

Specification forming part of Letters Patent No. 23,642, dated April 12, 1859; reissue No. 2,086, dated October 10, 1865; extended seven years; reissue No. 5,763, dated February 10, 1874; application filed July 8, 1873.

DIVISION A.

*To all whom it may concern:*

Be it known that I, JOHN F. GREENE, of Brooklyn, Kings county, New York, have invented a Process of Obtaining Fibers from Waste Felt, of which the following is a specification:

Many attempts have been made to disintegrate felted fabrics of fur and of wool so as to obtain from old and worn felts, and from the clippings produced in the manufacture of hats and other felts, the fibers in a condition suitable for being used as a part of the stock in the manufacture of felted and other fabrics; but prior to my invention, so far as I am informed, all such attempts have been unsuccessful, for the reason that the tearing apart of such old or waste felts rendered the fibers unserviceable for further use in felting.

The object of my invention is to so disintegrate old felts, and the clippings of new felts, or felts which for any cause have heretofore been of little or no use in the arts, that the fibers thereof may be obtained in a suitable condition to be employed to advantage in admixture with new fibers in the manufacture of felted or other fabrics, whether of wool or fur; and to this end my said invention consists in subjecting the felts which are to be disintegrated to the action of steam, preparatory to, and in combination with, the action of suitable machinery for picking and tearing it apart, to separate the fibers from each other, the action of steam on such fabrics having the effect, as I have discovered, of softening the fibers, and of loosening that hold or interlocking which the several fibers have, and which was produced in the original formation of the fabric by what is known as the "felting action," so that when so loosened or unlocked, the fibers can be separated without injury by the mechanical action of a picker.

If the felts to be disintegrated consist of the clippings produced in the manufacture of hats, or of old hats, or other felts which have been paid over or saturated with shellac or other mastic cement, or glue, I first treat them with a suitable solvent until the gum-resin or other cement is thoroughly extracted. The solution I use is made by taking fifty pounds of sal-soda to one hundred pounds of stock to be treated, and dissolving that in three hundred and twenty gallons of water. I boil the felts in this solution from half to one hour, and then let it steep in the said water without boiling for about three hours.

Care should be taken not to boil too long, as that will tend to fix the gum, &c., instead of extracting it.

After steeping the required length of time, I draw off the liquor, and wash the felts in clean water and dry them. But if the felts have not been coated or saturated with any like cementing substance, it will not be necessary to treat them in this manner. I then steam the felts to be disintegrated, so that the steam shall thoroughly penetrate and soften the same, and while so saturated subject them to the action of some suitable picker, by which the fibers are pulled apart, which will be done with comparative ease so long as they are steamed. After the fibers are delivered from the picker they are to be passed through a suitable blowing-machine to be sorted—that is to say, the fibers which are entirely free from others are to be separated from the lumps, consisting of an aggregation of numerous fibers, which lumps are then to be again subjected to the operation of the picker and blower.

And although I do not wish to limit myself to the use of a steaming and picking apparatus or machine, nor to a blower of any special construction, nevertheless I prefer the use of machinery constructed substantially in accordance with the description and drawings making part of two Letters Patent of even date with this, one being for a machine for tearing up waste and refuse felted fabrics, and the other an improved blower for separating the fibers from lumps and impurities.

I claim—

1. The process of loosening and softening the fibers of felts, preparatory to separating the same, by subjecting them to the action of steam, substantially as described.

2. The process of recovering fibers from felted fabrics by subjecting the fabrics first to the action of steam, and then to disintegrating mechanism, as set forth.

3. The process of treating stiffened felts, by subjecting them to the action of a solvent.

In testimony whereof I have signed my name to this specification in the presence of two subscribing witnesses.

JOHN F. GREENE.

Witnesses:
GEO. F. SEYMOUR,
REON BARNES.